United States Patent
Kondo

(10) Patent No.: US 6,927,876 B1
(45) Date of Patent: Aug. 9, 2005

(54) METHOD OF AND APPARATUS FOR GENERATION PROOF

(75) Inventor: Hirokazu Kondo, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 911 days.

(21) Appl. No.: 09/693,973

(22) Filed: Oct. 23, 2000

(30) Foreign Application Priority Data

Oct. 21, 1999 (JP) .................................. 11-300073

(51) Int. Cl.[7] .......................... G06F 15/00; G06K 1/00
(52) U.S. Cl. ...................... 358/1.9; 358/2.1; 358/3.1; 358/515; 358/518
(58) Field of Search .......................... 358/1.9, 2.1, 3.1, 358/515, 518

(56) References Cited

U.S. PATENT DOCUMENTS

| | | | |
|---|---|---|---|
| 5,144,419 A | * | 9/1992 | Nakatsuka et al. .......... 358/534 |
| 5,734,801 A | * | 3/1998 | Noguchi et al. ............. 358/1.9 |
| 6,043,909 A | * | 3/2000 | Holub ......................... 358/504 |
| 6,396,595 B1 | * | 5/2002 | Shimazaki ................... 358/1.9 |
| 6,738,168 B1 | * | 5/2004 | Usui et al. ................... 358/520 |

FOREIGN PATENT DOCUMENTS

| | | | | |
|---|---|---|---|---|
| EP | 0 877 525 A1 | 11/1998 | | H04N 1/60 |
| EP | 877525 A1 | * 11/1998 | | |
| JP | 11-27553 | 1/1999 | | H04N 1/60 |

* cited by examiner

Primary Examiner—Kimberly Williams
Assistant Examiner—Michael Burleson
(74) Attorney, Agent, or Firm—Sughrue Mion, PLLC

(57) ABSTRACT

A conversion table is generated for converting image data D to be processed by a first device into image data D' to be processed by a second device for thereby generating a proof. The conversion table saves an area percentage of an image of black produced from only the image data K by the first device, at the image data K=0% or 100%. Using the conversion table, the image data D is converted into the image data D' to generate a proof with the area percentage of black being saved.

14 Claims, 11 Drawing Sheets

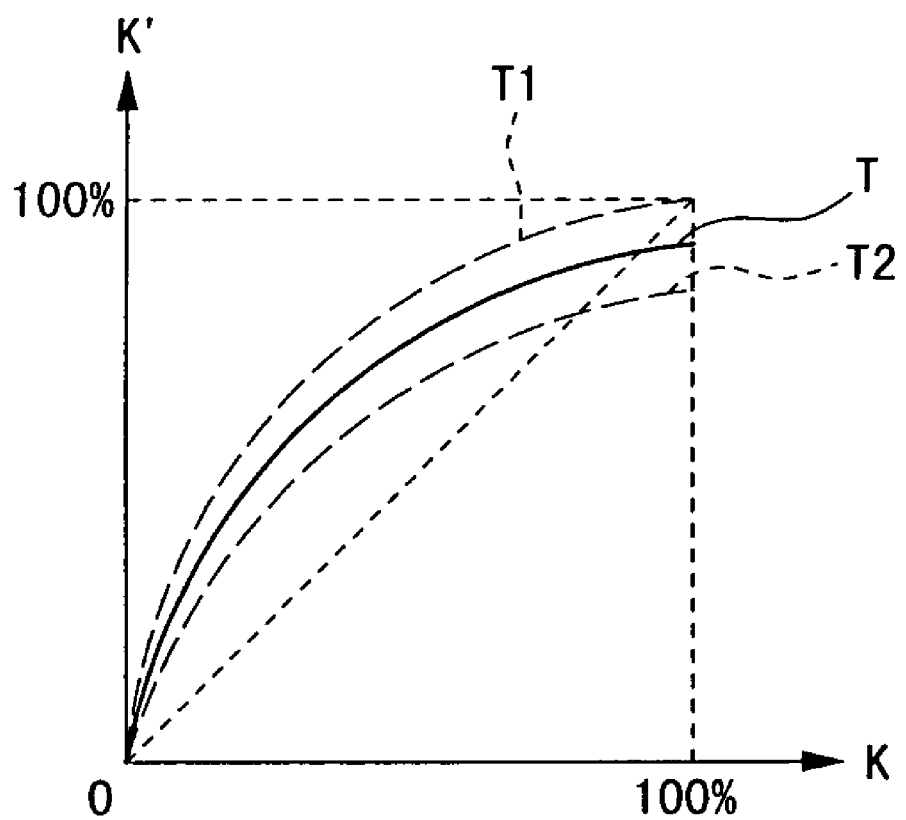

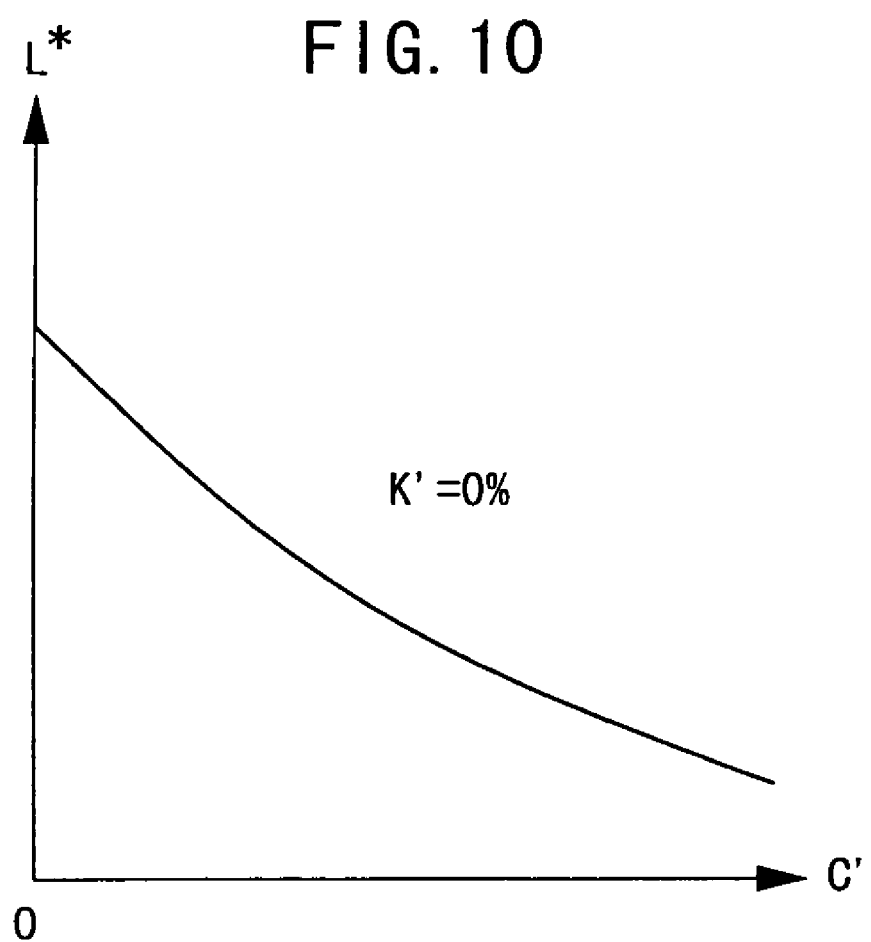

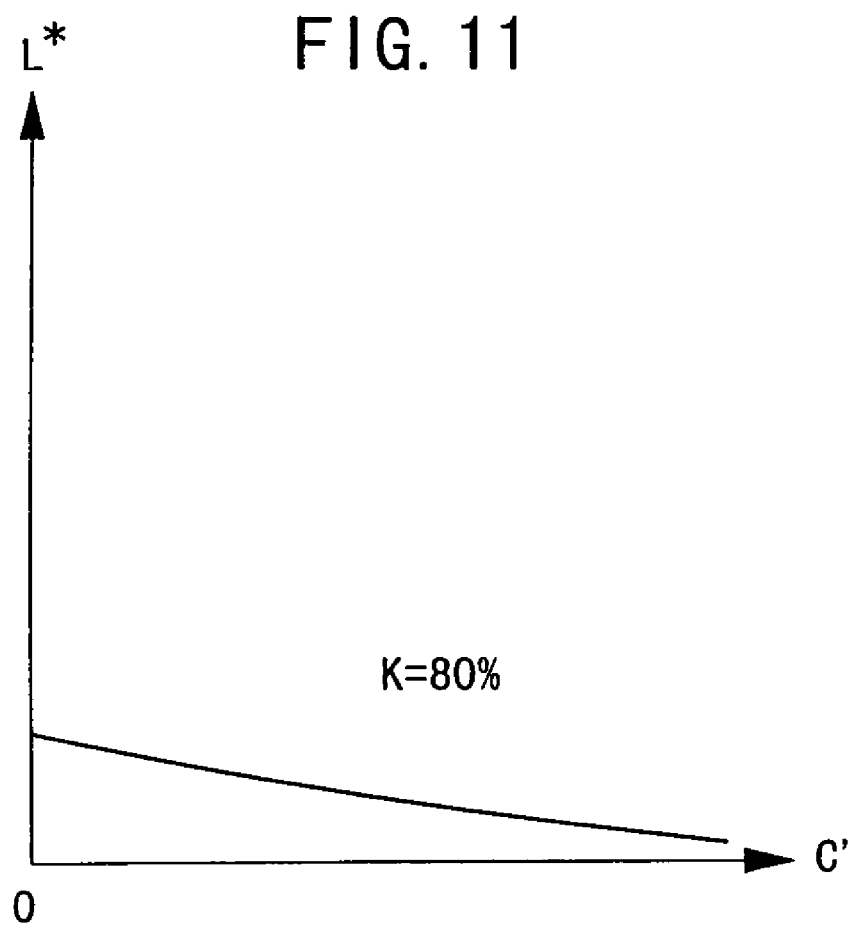

METHOD OF AND APPARATUS FOR GENERATION PROOF

BACKGROUND OF THE INVENTION

1. Field of the Invention

The present invention relates to a method of and an apparatus for generating a proof of an image generated by a first device, with a second device.

2. Description of the Related Art

For producing a printed material containing a color image, it is necessary to take into account various printing conditions including the type of inks and print sheets used to print the color image, the illumination used to observe the printed material, and various other factors in order to obtain the desired printed material. These printing conditions may be established by actually printing the color image in test under various printing conditions. However, it would not be practical to perform test printing processes under all combinations of various many printing conditions because such test printing processes would require a large expenditure of time and cost.

There has been developed a print proof generating apparatus capable of easily simulating finished states of a printed material without carrying out an actual printing process. The developed print proof generating apparatus operates by converting printing image data supplied to generate a printed material in view of various printing conditions thereby to generate device-independent colorimetric data of expected colors of the printed material, thereafter converting the device-independent colorimetric data into proof image data that take into account the characteristics of the print proof generating apparatus, and then generating a proof based on the proof image data.

Since the print proof generating apparatus allows printing conditions to be freely established by a conversion table which converts printing image data into calorimetric data, it is possible to generate a proof easily and inexpensively and then determine printing conditions capable of obtaining a desired printed material from the proof.

Theoretically, all colors of color printed materials can be formed from three colors, i.e., C (cyan), M (Magenta), and Y (Yellow). However, the inks that provide these colors may not necessarily have ideal spectral characteristics. In order to compensate for the lack of such ideal spectral characteristics, it has been customary to add the ink of K (black) to those of C, M, Y to produce color printed materials with four colors. For producing highly accurate color proofs, the print proof generating apparatus also use four colors of C, M, Y, K.

The device-independent colorimetric data representing colors are expressed by three variables such as colorimetric values $L^*$, $a^*$, $b^*$ of the CIE calorimetric system or tristimulus values X, Y, Z. However, the proof image data are expressed by four variables of C, M, Y, K. Therefore, a conversion table for converting colorimetric data into proof image data cannot uniquely determine proof image data because it needs to convert three variables into four variables.

One solution is to determine K of the proof image data based on the colorimetric value $L^*$ and then determine remaining C, M, Y of the proof image data from the colorimetric values $L^*$, $a^*$, $b^*$. However, this approach is disadvantageous in that even if the printing image data represents K only as with a printed material containing only characters, proof image data of C, M, Y may possibly be generated from the colorimetric value $L^*$, and even if the printing image data does not contain data representing K, proof image data of K may possibly be generated. When these drawbacks occur, the printed material that is actually produced may not be in agreement with the proof highly accurately.

According to another proposal, a colorimetrically measurable gradation pattern in black only is produced as both a printed material and a proof, the association between the lightness levels of color values obtained by colorimetrically measuring the printed material and the proof is determined with respect to K, and then a conversion table for C, M, Y, K is produced based on the determined association (see Japanese laid-open patent publication No. 11-27553).

The above proposed process does not consider the difference between area percentages and the difference between densities due to the dot gains of the printed material which represents a halftone dot image and the proof. Therefore, if an area gradation image is reproduced as a proof, then the reproduced image may have different gradation characteristics.

SUMMARY OF THE INVENTION

It is a general object of the present invention to provide a method of and an apparatus for generating a proof to bring an image produced by a first device and a proof produced by a second device into agreement with each other highly accurately without any appreciable discrepancies in view of the difference between area percentages and the difference between densities due to the dot gains of the image and the proof.

A major object of the present invention is to provide a method of and an apparatus for generating a proof to bring a printed material which represents a halftone dot image and its proof into agreement with each other highly accurately.

Another object of the present invention is to provide a method of and an apparatus for generating a proof to bring a printed material which comprises characters and line drawings and its proof into agreement with each other highly accurately.

Still another object of the present invention is to provide a method of and an apparatus for generating a proof to bring area percentages and densities, with respect to black, of a printed material and its proof into agreement with each other highly accurately.

Yet another object of the present invention is to provide a method of and an apparatus for generating a proof to bring area percentages and densities of a printed material and its proof into agreement with each other highly accurately.

The above and other objects, features, and advantages of the present invention will become apparent from the following description when taken in conjunction with the accompanying drawings in which preferred embodiments of the present invention are shown by way of illustrative example.

BRIEF DESCRIPTION OF THE DRAWINGS

FIG. 9 is a diagram showing a K gradation conversion table produced using an internal ratio;

FIG. 10 is a diagram showing the relationship between the lightness and the proof image data when the area percentage of black is 0%; and FIG. 11 is a diagram showing the relationship between the lightness and the proof image data when the area percentage of black is 80%.

DESCRIPTION OF THE PREFERRED EMBODIMENTS

Figure 1:
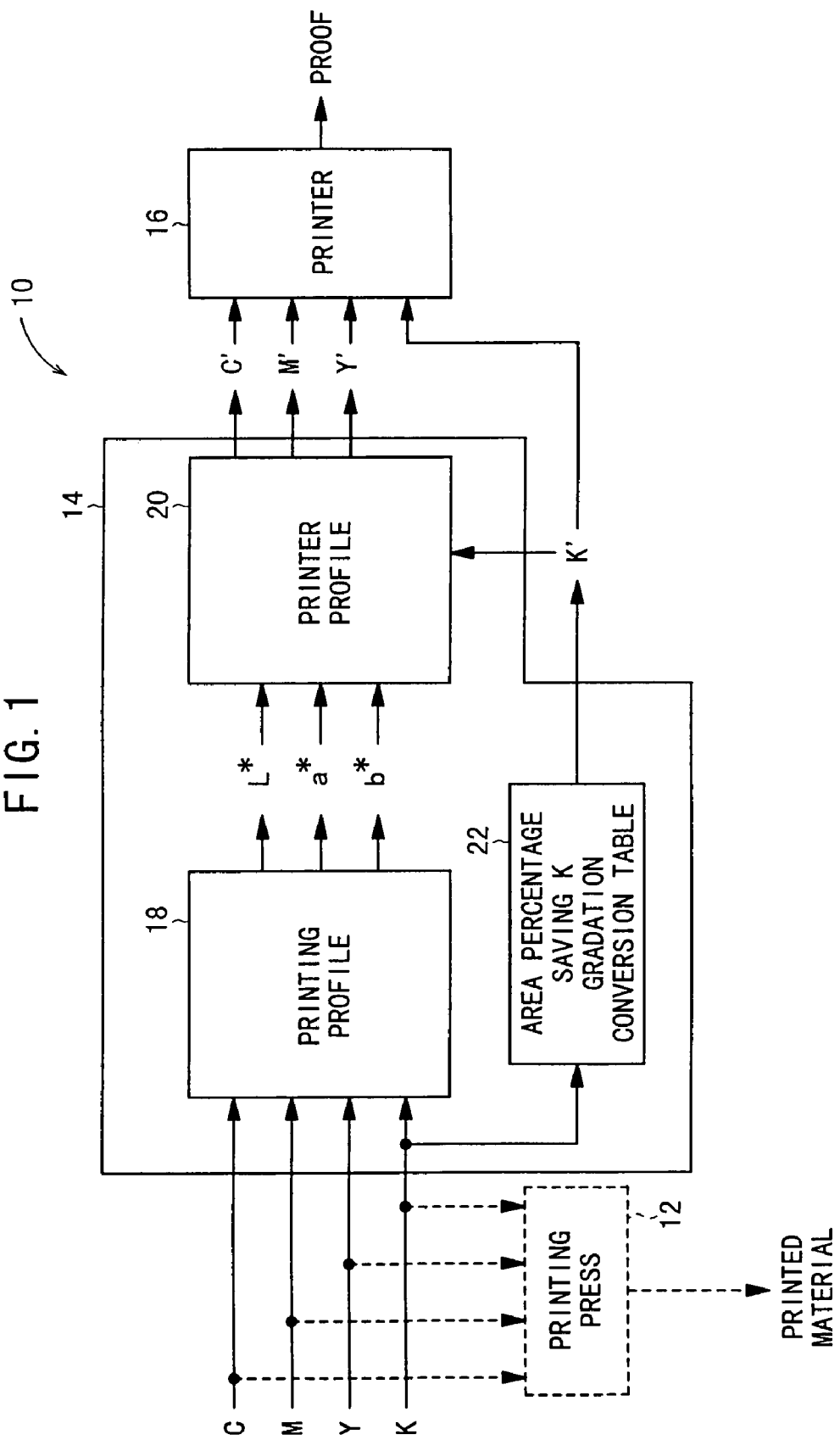
FIG. 1 is a block diagram of a printing proof generating apparatus according to an embodiment of the present invention.

FIG. 1 shows in block form a printing proof generating apparatus 10 according to an embodiment of the present invention.

As shown in FIG. 1, the printing proof generating apparatus 10 generates a proof for a printed material that is produced by a printing press 12 (first device) based on separated printing image data C, M, Y, K (image data D). The printing proof generating apparatus 10 has an image data converter 14 for converting the printing image data C, M, Y, K into proof image data C', M', Y', K' (image data D'), and a printer 16 (second device) for outputting a halftone dot image, as a proof, based on the proof image data C', M', Y', K' produced by the image data converter 14.

The image data converter 14 basically comprises a printing profile 18 for converting the printing image data C, M, Y, K into colorimetric values $L^*$, $a^*$, $b^*$ of the CIE colorimetric system, which are device-independent image data, a printer profile 20 (second conversion table) for converting the colorimetric values $L^*$, $a^*$, $b^*$ into proof image data C', M', K' according to the output characteristics of the printer 16, and an area percentage saving K gradation conversion table 22 (first conversion table) for producing proof image data K' which allow an area percentage on the printed material based on the printing image data K to be reproduced accurately on the proof.

The printing profile 18 is a conversion table established based on printing conditions including the characteristics, including printing pressure, of the printing press 12, the characteristics of inks used by the printing press 12, and the type of print sheets used by the printing press 12. The printing profile 18 is established as a plurality of printing profiles that can be selected according to combinations of those printing conditions. The printing profile 18 can be determined by, for example, colorimetrically measuring the colorimetric values $L^*$, $a^*$, $b^*$ of a printed material that has been produced under given printing conditions by the printing press 12 based on the printing image data C, M, Y, K, and determining, as the printing profile 18, the relationship for converting the printing image data C, M, Y, K into the calorimetric values $L^*$, $a^*$, $b^*$.

Figure 2:
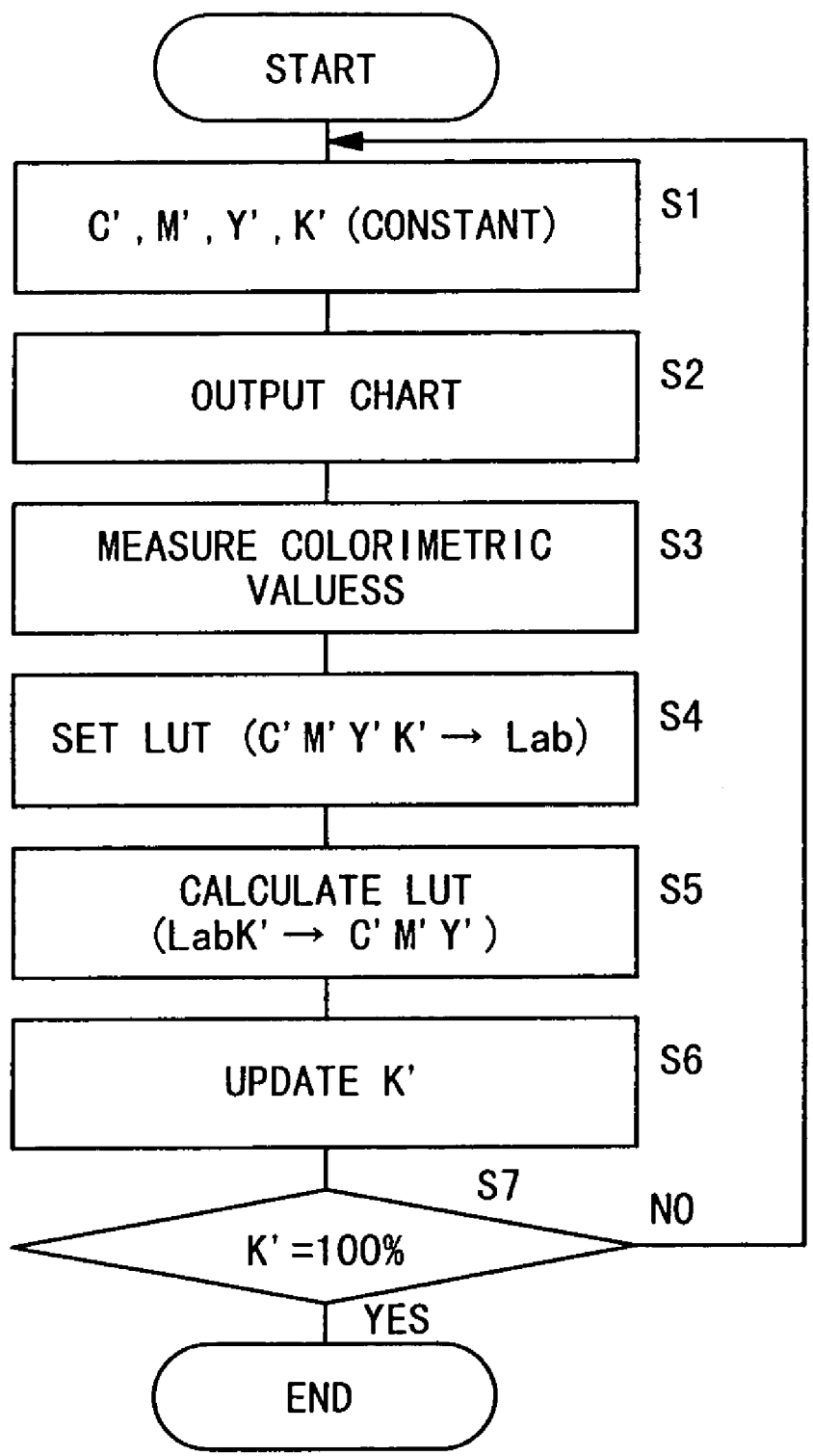
FIG. 2 is a flowchart of a process of generating a printer profile of the printing proof generating apparatus shown in FIG. 1.

The printer profile 20 is a conversion table established based on the output characteristics of the printer 16, and is determined according to a process shown in FIG. 2.

As shown in FIG. 2, a plurality of proof image data C', M', Y', K' including proof image data K' having an area percentage of 0% and proof image data C', M', Y' having area percentages at increments of 10% are generated in step S1. Then, the printer 16 outputs a chart comprising a plurality of patches based on the proof image data C', M', Y', K' in step S2. Colorimetric values $L^*$, $a^*$, $b^*$ of each of the patches are measured by a calorimeter in step S3. A forward conversion table LUT (C'M'Y'K'→Lab) for converting the proof image data C', M', Y', K' into the colorimetric values $L^*$, $a^*$, $b^*$ is determined in step S4.

Using the forward conversion table LUT (C'M'Y'K'→Lab), an inverse conversion table LUT (LabK'→C'M'K') for converting the colorimetric values $L^*$, $a^*$, $b^*$ with respect to the proof image data K' (0%) into the proof image data C', M', K' is determined in step S5. The inverse conversion table LUT (LabK'→C'M'K') can be determined according to the Newtonian process which is a typical successive approximation process.

Then, the proof image data K' is updated successively into area percentages of 10%, 20%, . . . , 100% in step S6, and the processing of steps S1–S5 is repeated until the area percentage of the proof image data K' becomes 100% in step S7. In this manner, a plurality of inverse conversion tables LUT (LabK'→C'M'K') for converting the calorimetric values $L^*$, $a^*$, $b^*$ with respect to each of the proof image data K' into the proof image data C', M', K' are determined. The determined inverse conversion tables LUT (LabK'C'M'K') are set as a plurality of printer profiles 20.

The area percentage saving K gradation conversion table 22 is a conversion table for converting the gradations of the printing image data K based on the output characteristics of the printer 16 into the proof image data K'. The area percentage saving K gradation conversion table 22 is established such that the halftone dot area percentage of a printed material produced based on the printing image data K only and the halftone dot area percentage of a proof produced based on the proof image data K' only are equal to each other.

Specifically, a printed material produced by the printing press 12 and a proof produced by the printer 16 have different dot gains because they use different inks and sheets. If the printing image data K and the proof image data K' were set equally to each other, then the reproduced images would have different gradation characteristics. The area percentage saving K gradation conversion table 22 is established according to a solid-line curve shown in FIG. 3, for example, for each of the combinations of printing conditions and proof outputting conditions such that the printed material and the proof have the same halftone dot area percentage regardless of their different dot gains. If the printing image data K has a halftone dot area percentage of 0% or 100% as with characters or line drawings, then the proof image data K' is set to have a halftone dot area percentage of 0% or 100%. In this manner, characters or line drawings are prevented from being blurred. The area percentage saving K gradation conversion table 22 is established as a plurality of area percentage saving K gradation conversion table that can be selected according to combinations of the printing conditions and the proof output conditions.

The printing proof generating apparatus 10 is basically constructed as described above. A method of generating a proof on the printing proof generating apparatus 10 will be described below.

With the printing profiles 18, the printer profiles 20, and the area percentage saving K gradation conversion tables 22 being set in the image data converter 14, desired printing image data C, M, Y, K are supplied to the image data converter 14.

The supplied printing image data C, M, Y, K are converted into colorimetric values L*, a*, b* by a printing profile 18 selected according to the printing conditions. The printing image data K is converted into proof image data K' for generating black to be outputted by the printer 16, by an area percentage saving K gradation conversion table 22 selected according to the printing conditions and the proof output conditions.

A printer profile 20 set with respect to the proof image data K' is selected based on the proof image data K'. The printer profile 20 converts the colorimetric values L*, a*, b* into proof image data C', M', Y'. If the printing profiles 18 and the printer profiles 20 in the image data converter 14 are produced with halftone dot area percentages at increments of 10%, then intermediate data between those halftone dot area percentages may be obtained by interpolation or the like.

The proof image data C', M', Y', K' produced by the image data converter 14 are supplied to the printer 16, which generates a proof.

Figure 3:
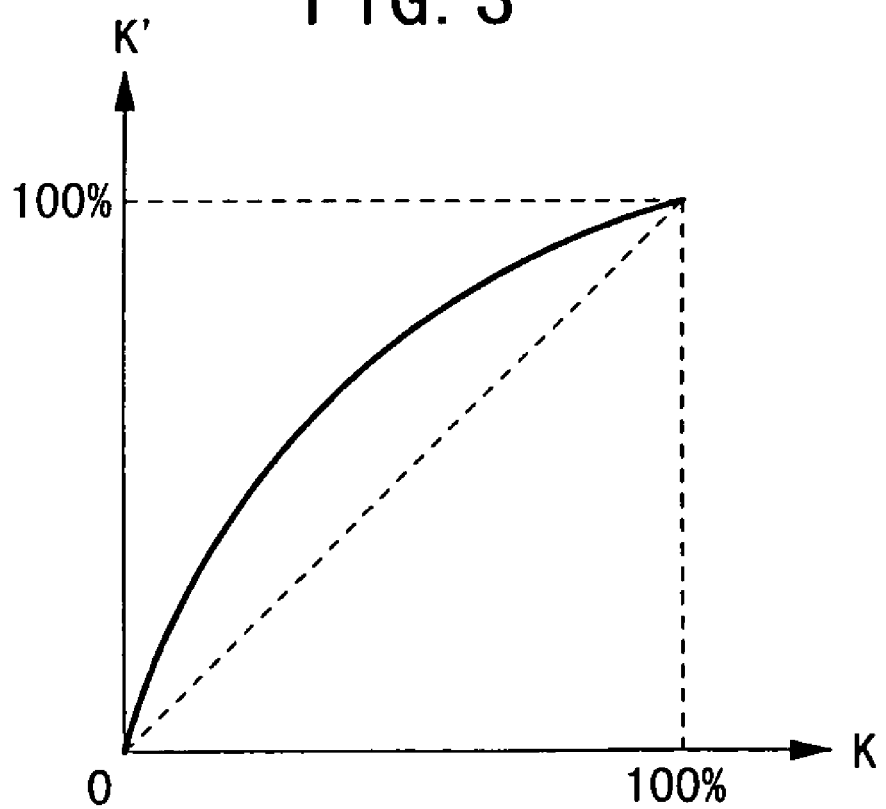
FIG. 3 is a diagram illustrative of an area percentage saving K gradation conversion table of the printing proof generating apparatus shown in FIG. 1.

The proof thus generated is such that the color black (K') is independent of the other colors (C', M', Y'). Therefore, the image of the proof is accurately representative of the image of the printed material without any appreciable discrepancies. Since the proof saves a halftone dot area percentage of black, it is accurate enough to reproduce halftone dot images of black only. As shown in FIG. 3, since the printing image data K which has a halftone dot area percentage of 0% or 100% is converted into the proof image data K' which has a halftone dot area percentage of 0% or 100%, characters or line drawings on the proof are prevented from being blurred.

Figure 4:
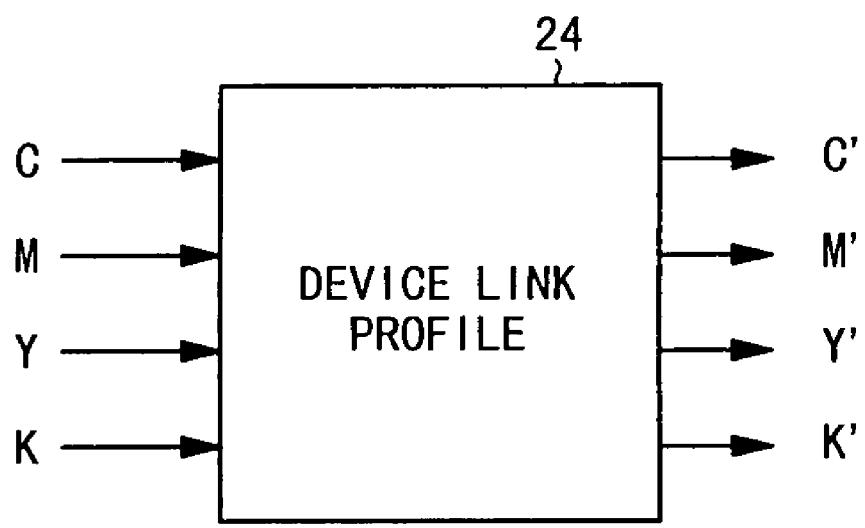
FIG. 4 is a block diagram of another image data converter for use in the printing proof generating apparatus shown in FIG. 1.

In the above embodiment, each of the printing profiles 18, the printer profiles 20, and the area percentage saving K gradation conversion tables 22 is established as an independent conversion table for converting image data. However, when a printing profile 18 and an area percentage saving K gradation conversion table 22 are selected, the printing profile 18, the area percentage saving K gradation conversion table 22, and the printer profile 20 may be combined into a device link profile 24 comprising a single conversion table, and the image data may be processed by the combined device link profile 24. According to the arrangement shown in FIG. 4, the image data can be converted quickly by the image data converter 14.

In the above embodiment, when the printing image data K is converted into the proof image data K', the area percentage saving K gradation conversion table 22 is used which is capable of bringing the halftone dot area percentages of the printed material and the proof into agreement with each other. However, a density saving K gradation conversion table capable of bringing the densities of a printed material and a proof into agreement with each other may be used. Specifically, if image data are considered in terms of halftone dot area percentages, then the density of an image having a halftone dot area percentage of 100% on a printed material and the density of an image having a halftone dot area percentage of 100% on a proof may considerably be different from each other. In this case, if the area percentage saving K gradation conversion table 22 shown in FIG. 3 is used, then the image is reproduced with different densities in its entirety. A density saving K gradation conversion table having characteristics shown in FIG. 5 may be established, and printing image data K may be converted into proof image data K' by the density saving K gradation conversion table shown in FIG. 5 to produce a proof which has the same density of black as the density of black on a printed material.

When the printer 16 produces halftone dot images, the density saving K gradation conversion table can produce a density equal to the density of printing image data K having a halftone dot area percentage of 100%, but may possibly fail to produce proof image data K' having a halftone dot area percentage of 100%. In order to achieve both the density and halftone dot area percentage requirements, a density saving K gradation conversion table shown in FIG. 6 may be used which applies proof image data K' having a halftone dot area percentage of 100% to printing image data K having a halftone dot area percentage of 100% to equalize the halftone dot area percentages, and equalizes densities at other halftone dot area percentages.

Figure 6:
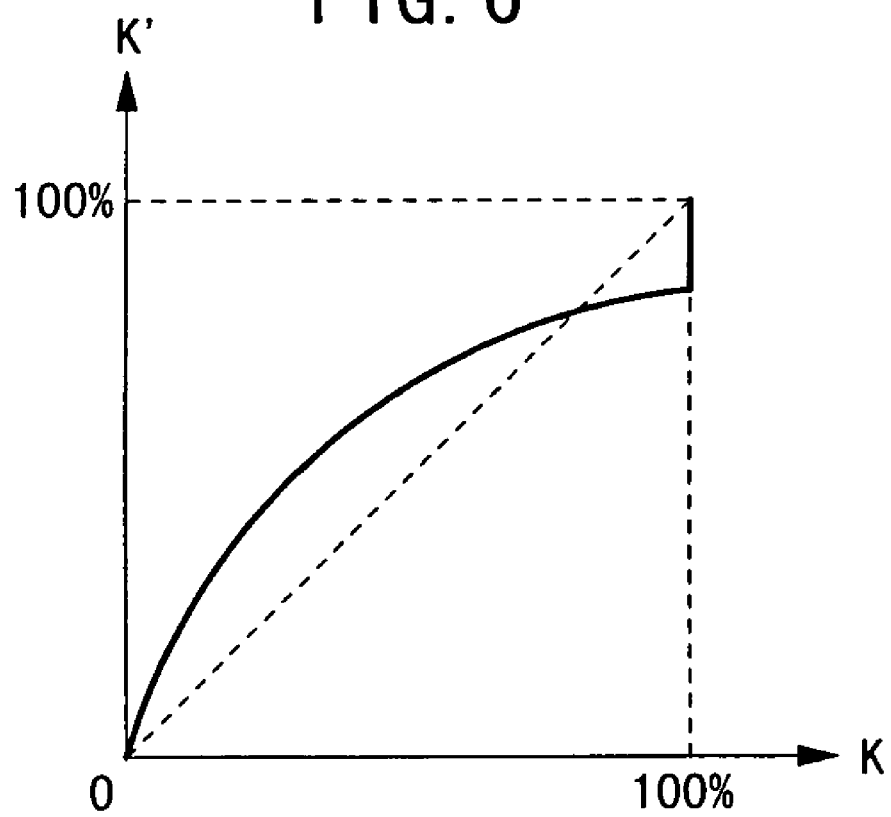
FIG. 6 is a diagram illustrative of a second density saving K gradation conversion table capable of saving area percentages at 0% and 100% and saving densities at other regions.

If the density saving K gradation conversion table shown in FIG. 6 is used, then it is possible to obtain a proof capable of equalizing densities highly accurately, and reproduce an image having a halftone dot area percentage of 0% or 100%, such as a character image or a line drawing image, highly accurately. Natural color images are considered as being practically free of images having a halftone dot area percentage of 100%. Therefore, reproduced images of such natural color images do not suffer a tone jump even if the halftone dot area percentage is abruptly changed near 100%.

Figure 7:
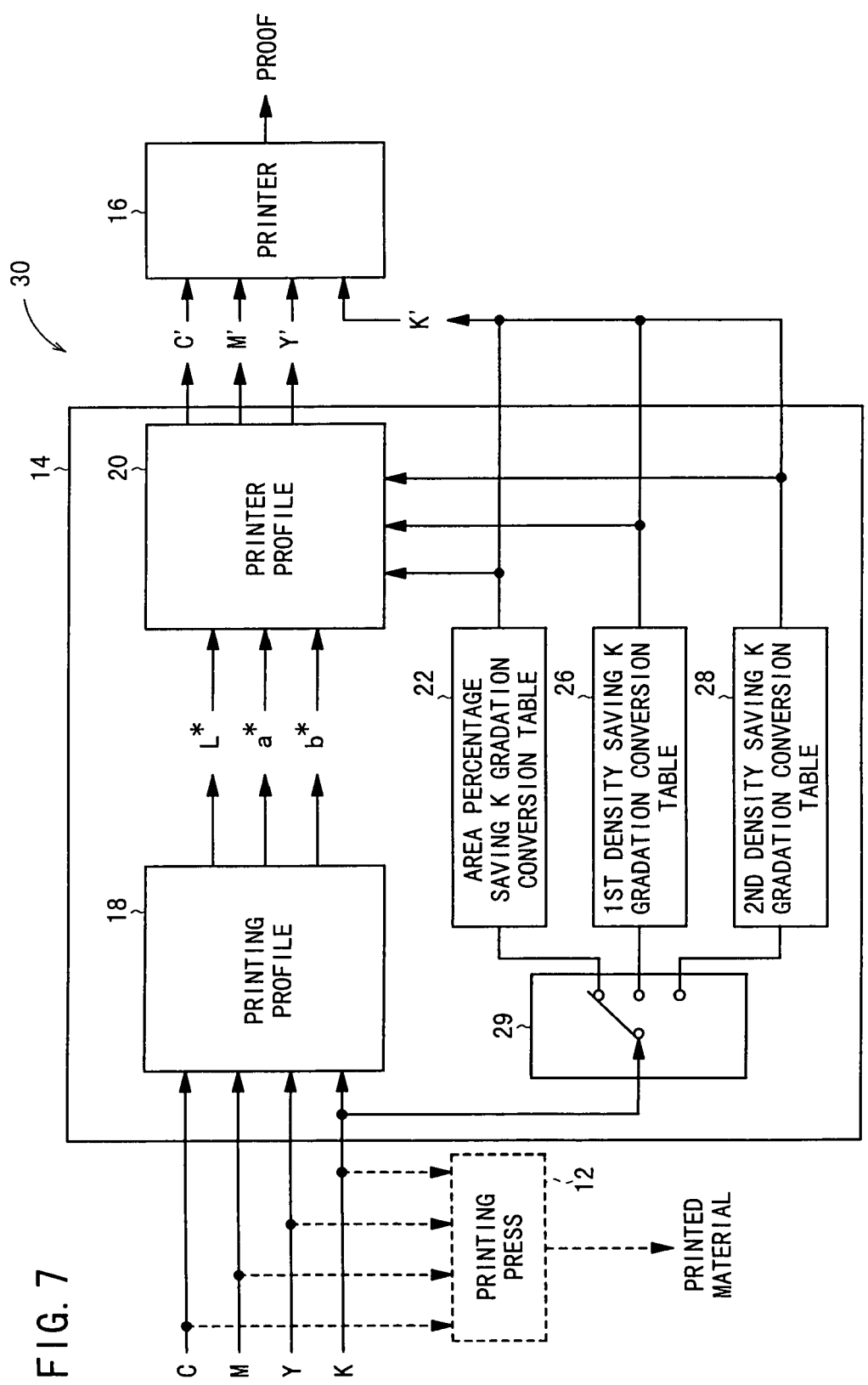
FIG. 7 is a block diagram of a printing proof generating apparatus according to another embodiment of the present invention.

FIG. 7 shows a printing proof generating apparatus 30 according to another embodiment of the present invention. As shown in FIG. 7, the printing proof generating apparatus 30 has an area percentage saving K gradation conversion table 22 (first conversion table) having the conversion characteristics shown in FIG. 3, a first density saving K gradation conversion table 26 (second conversion table) having the conversion characteristics shown in FIG. 5, and a second density saving K gradation conversion table 28 (third conversion table) having the conversion characteristics shown in FIG. 6. One of these conversion table 22, 26, 28 can be selected at a time by a switch 29 (table selecting means). The other details of the printing proof generating apparatus 30 are identical to those of the printing proof generating apparatus 10 shown in FIG. 1. The printing proof generating apparatus 30 is capable of generating an optimum proof based on the characteristics of an image to be printed.

Figure 5:
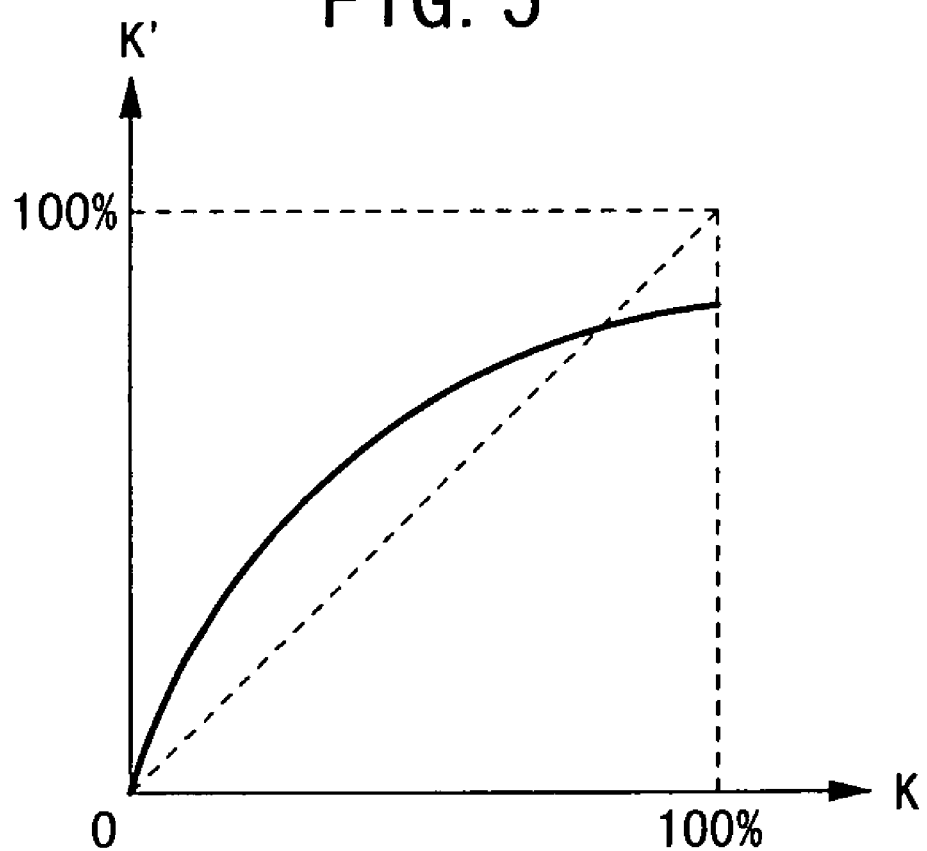
FIG. 5 is a diagram illustrative of a first density saving K gradation conversion table capable of fully saving densities.

As shown in FIGS. 5 and 6, the first density saving K gradation conversion table 26 and the second density saving K gradation conversion table 28 only differ from each other with respect to the halftone dot area percentage at 100%. Therefore, it may be determined whether the halftone dot area percentage of the printing image data K is 100% or not, and if the halftone dot area percentage of the printing image data K is 100%, then a printer profile 20 may be selected based on the printing image data K, rather than the first density saving K gradation conversion table 26. With this modification, the second density saving K gradation conversion table 28 may be dispensed with, resulting in a reduced amount of stored data.

If the halftone dot area percentage of the printing image data K is 100%, then the proof is necessarily black irrespective of the other printing image data C, M, Y. In this case, therefore, the printing image data C, M, Y, K may be supplied as the proof image data C', M', Y', K' directly to the printer 16, rather than passing through the image data converter 14.

Figure 8:
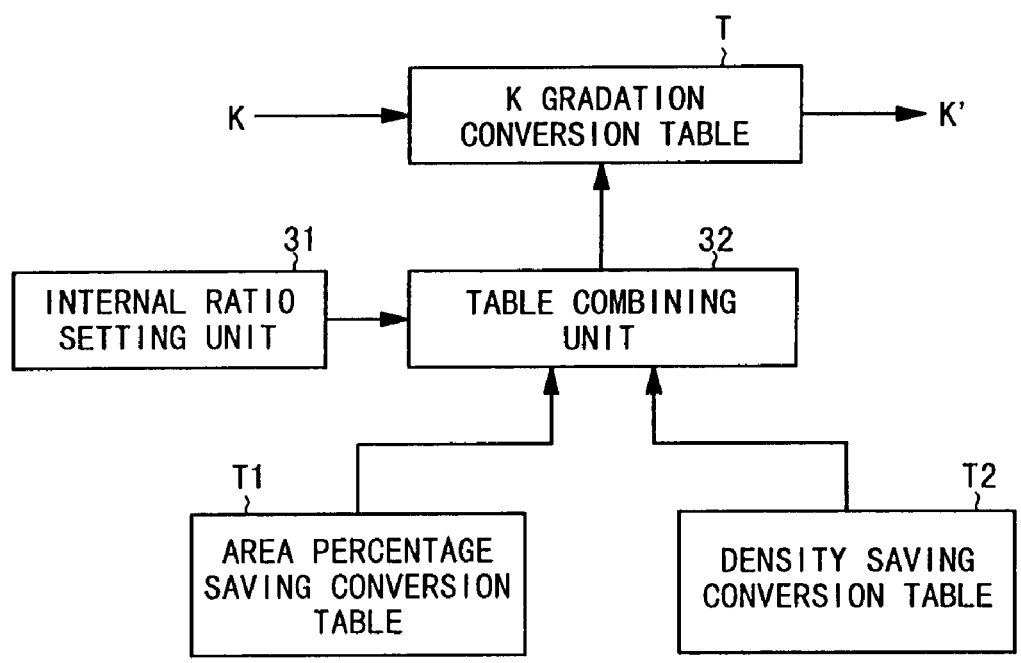
FIG. 8 is a block diagram of a system for producing a K gradation conversion table using an internal ratio.

As shown in FIGS. 8 and 9, an internal ratio r between the halftone dot area percentage and the density may be established depending on the printing image data K, and a K gradation conversion table T as a conversion table for the printing image data K may be generated according to the internal ratio r.

Specifically, an area percentage saving conversion table T1 (FIG. 3) capable of saving area percentages in the entire range (0%–100%) of the printing image data K, and a density saving conversion table T2 (FIG. 5) capable of saving densities in the entire range (0%–100%) of the printing image data K are prepared. An internal ratio setting unit 31 sets an internal ratio r (0.0 r 1.0) according to an instruction from the operator, and outputs the set internal ratio r to a table combining unit 32. The table combining unit 32 combines the area percentage saving conversion table T1 and the density saving conversion table T2 according to the internal ratio r to produce a K gradation conversion table T represented by:

$$T=(1-r)\cdot T1+r\cdot T2$$

Using the K gradation conversion table T thus established, the printing image data K is converted into proof image data K' for thereby producing a proof image with both the halftone dot area percentages and the densities being appropriately saved.

If the table having the characteristics shown in FIG. 6 is set as the density saving conversion table T2, then when K=100%, proof image data K' with an area percentage K'=100% can be produced independently of the internal ratio r.

In the above embodiments, a chart is produced by changing the proof image data C', M', Y', K' in increments of 10% for producing the printer profiles 20. However, the proof image data C', M', Y', K' may be changed in smaller increments for lighter colors and larger increments for darker colors, such as in increments of 0%, 25%, 50%, 100%, for example, and intermediate data may be obtained by interpolation. Specifically, as shown in FIG. 10, if the proof image data K' is smaller, the lightness is greater and the proof image data C' changes greatly upon a change in the calorimetric data L*. Therefore, it is necessary to set the proof image data C', M', Y', K' at smaller intervals. Conversely, as shown in FIG. 11, if the proof image data K' is larger, the lightness is smaller and the proof image data C' changes to a small degree upon a change in the calorimetric data L*. Therefore, the proof image data C', M', Y', K' may be set at larger intervals without posing an accuracy problem. When the proof image data K' is K'=100%, in particular, the printing image data C, M, Y may be equal to the proof image data C', M', Y'.

In the above embodiments, the calorimetric values L*, a*, b* of the CIE colorimetric system are employed as device-independent image data. However, other device-independent image data, such as tristimulus values X, Y, Z, may be employed.

Although certain preferred embodiments of the present invention has been shown and described in detail, it should be understood that various changes and modifications may be made therein without departing from the scope of the appended claims.

What is claimed is:

1. A method of generating a proof, comprising the steps of:
   converting image data D including image data K corresponding to black, to be processed by a first device, into image data D' including image data K' corresponding to black, to be processed by a second device, according to a conversion table;
   generating the conversion table for converting said image data D into said image data D' while saving an area percentage of an image of black produced from only said image data K by said first device, at said image data K=0% or 100%; and
   converting said image data D into said image data D' with said conversion table for thereby generating a proof represented by area gradations of an image generated by said first device, with said second device.

2. A method according to claim 1, wherein said conversion table comprises a first conversion table for converting said image data K into said image data K', and a second conversion table, generated for each said image data K', for converting said image data D except said image data K into said image data D' except said image data K', further comprising the steps of:
   determining said image data K' while saving the area percentage of the image at said image data K=0% or 100% from said image data K according to said first conversion table;
   selecting said second conversion table based on said image data K'; and
   determining said image data D' from said image data D according to the selected second conversion table.

3. A method according to claim 1, further comprising the step of:
   establishing said conversion table so as to save a density of the image of black produced from only said image data K by said first device, in a range except said image data K=0% or 100% at which the area percentage of the image is saved.

4. A method according to claim 2, further comprising the step of:
   establishing said conversion table so as to save a density of the image of black produced from only said image data K by said first device, in a range except said image data K=0% or 100% at which the area percentage of the image is saved.

5. A method according to claim 1, wherein said conversion table has a ratio set for saving an area percentage and density of the image of black produced from only said image data K by said first device, according to a predetermined internal ratio.

6. A method according to claim 2, wherein said conversion table has a ratio set for saving an area percentage and density of the image of black produced from only said image data K by said first device, according to a predetermined internal ratio.

7. The method of claim 1, wherein the image data K is processed independently of the non-black data to obtain image data K'.

8. An apparatus for generating a proof, comprising:
   means for converting image data D including image data K corresponding to black, to be processed by a first device, into image data D' including image data K' corresponding to black, to be processed by a second device, according to a conversion table;
   a conversion table for converting said image data D into said image data D' while saving an area percentage of an image of black produced from only said image data K by said first device, at said image data K=0% or 100%; and
   means for converting said image data D into said image data D' with said conversion table for thereby generating a proof represented by area gradations of an image generated by said first device, with said second device.

9. An apparatus according to claim 8, wherein said conversion table comprises a first conversion table for converting said image data K into said image data K', and a second conversion table, generated for each said image data K', for converting said image data D except said image data K into said image data D' except said image data K', further comprising:
   means for determining said image data K' while saving the area percentage of the image at said image data K=0% or 100% from said image data K according to said first conversion table;
   means for selecting said second conversion table based on said image data K'; and
   means for determining said image data D' from said image data D according to the selected second conversion table.

10. An apparatus according to claim 8, further comprising:
   means for establishing said conversion table so as to save a density of the image of black produced from only said image data K by said first device, in a range except said image data K= 0% or 100% at which the area percentage of the image is saved.

11. An apparatus according to claim 9, further comprising:
   means for establishing said conversion table so as to save a density of the image of black produced from only said image data K by said first device, in a range except said image data K= 0% or 100% at which the area percentage of the image is saved.

12. An apparatus according to claim 8, further comprising:
   an area percentage saving conversion table for saving the area percentage of the image of black produced from only said image data K by said first device;
   a density saving conversion table for saving a density of the image of black produced from only said image data K;
   internal ratio setting means for setting an internal ratio between said area percentage and said density; and
   table combining means for combining said area percentage saving conversion table and said density saving conversion table to produce said conversion table according to the internal ratio set by said internal ratio setting means.

13. An apparatus according to claim 9, further comprising:
   an area percentage saving conversion table for saving the area percentage of the image of black produced from only said image data K by said first device;
   a density saving conversion table for saving a density of the image of black produced from only said image data K;
   internal ratio setting means for setting an internal ratio between said area percentage and said density; and
   table combining means for combining said area percentage saving conversion table and said density saving conversion table to produce said conversion table according to the internal ratio set by said internal ratio setting means.

14. An apparatus for generating a proof, comprising:
   means for converting image data D including image data K corresponding to black, to be processed by a first device, into image data D' including image data K' corresponding to black, to be processed by a second device, according to a conversion table;
   a first conversion table for saving an area percentage of an image of black produced from only said image data K by said first device;
   a second conversion table for saving a density of the image of black produced from only said image data K by said first device;
   a third conversion table for saving the area percentage of the image of black produced from only said image data K at said image data K=0% or 100%, and saving the density of the image of black produced from only said image data K in a range except the image data K=0% or 100%;
   table selecting means for selecting one of said first conversion table, said second conversion table, and said third conversion table; and
   means for converting said image data D into said image data D' with the conversion table selected by said table selecting means for thereby generating a proof represented by area gradations of an image generated by said first device, with said second device.

* * * * *